United States Patent [19]

Umlah et al.

[11] Patent Number: 5,071,029
[45] Date of Patent: Dec. 10, 1991

[54] FUNCTIONAL AND ECONOMICAL PLASTIC CAN

[75] Inventors: Anthony E. Umlah, Landenberg; Paul E. Titter, Sr., Media, both of Pa.; Vincent W. Keedy, New Castle; Richard D. Kinard, Wilmington, both of Del.; Frank J. Atkins, Aston, Pa.

[73] Assignee: E. I. Du Pont de Nemours and Company, Wilmington, Del.

[21] Appl. No.: 602,347

[22] Filed: Oct. 23, 1990

[51] Int. Cl.$^5$ ............... B65B 3/04; B65B 7/00; B65B 23/00; B29C 5/06
[52] U.S. Cl. ............... 220/672; 220/675; 53/420; 53/476; 264/464; 264/514
[58] Field of Search ............... 220/611, 672, 675; 53/420, 476; 29/511, 509, 516; 264/25, 180, 464, 468, 514

[56] References Cited

U.S. PATENT DOCUMENTS

| | | | |
|---|---|---|---|
| 1,649,292 | 11/1927 | Draper | 220/672 |
| 1,797,014 | 3/1931 | Nichols | 220/672 |
| 3,297,194 | 1/1967 | Schaper et al. | 220/672 |
| 3,472,418 | 10/1969 | Ullman | 220/672 |
| 3,985,257 | 10/1976 | Shaffer et al. | 220/672 |
| 4,610,366 | 9/1986 | Estes et al. | 220/672 |
| 4,781,301 | 11/1988 | Le Bret et al. | 220/672 |

Primary Examiner—Joseph Man-Fu Moy

[57] ABSTRACT

A plastic can, having a cylindrical sidewall with circumferential beads and a flange at each end is disclosed. The material of construction preferably includes a structural layer and a barrier layer; the thickness and dimensions of the wall permit lidding with metal lids and retorting of the filled can without leakage or collapse.

30 Claims, 10 Drawing Sheets

FUNCTIONAL AND ECONOMICAL PLASTIC CAN

BACKGROUND OF THE INVENTION

This invention relates to an economical plastic can and a process for preparing such a can.

Plastic cans are desirable for containing food products because it is possible to produce and process them at costs below those for metal cans. Furthermore, plastic cans are not subject to denting during handling, a problem with metal cans which can make them undesirable to the consumer. In addition, plastic cans may be made of transparent materials which can be used to display the contents.

However, plastic cans in the existing art have exhibited several problems. One problem arises when hot contents are inserted into the can and the can is sealed before the contents cool or where hot contents are added and the can is sealed and retorted without careful control of the pressure imposed on the can. If negative pressure (vacuum) in the can is generated, due to contraction or condensation of the contents, so that the external pressure exceeds the internal pressure by more than about 28 kPa (4 psig), inward collapse of the can walls can occur. Metal cans are much less sensitive to this phenomenon. Strengthening the walls by adding more plastic, in an attempt to avoid this problem, can make the cans economically unattractive.

Most plastic cans in commerce have been designed for use under little pressure differential under ambient conditions. An example is oil cans, which are filled and sealed near room temperature. Although some plastic cans have been designed with a deformable molded end which will accommodate compressive forces, such cans are expensive to make and cannot compete commercially with conventional metal cans. There is thus a need for an inexpensive extruded can which can withstand significant compressive stress without deforming and which readily accepts standard metal ends to form a reliable, hermetic, retortable seal.

U.S. Pat. No. 4,655,682 discloses a hot fillable, collapse resistant polyester container. If desired the sidewall may be provided with internally directed vertically collapsible beads to accommodate a decrease in volume with the container as the product cools. The beads are formed by internal ribs of a blow mold.

U.S. Pat. No. 3,971,173 discloses a process for heat treating plastic bottles to reduce their creep characteristics.

U.S. Pat. No. 3,410,939 discloses a straight-walled, monolayer, polypropylene can with two metal ends double seamed to the flanged can end. The body is cut from an extruded tube and the flanges are cold-formed. The body wall is about 0.79–0.89 mm (31–35 mils) thick. The flange is "something less," tapered, and oriented about 45 degrees to the body. The can is designed to contain oil.

U.S. Pat. No. 3,491,936 discloses a straight-walled, monolayer, plastic can, injection molded with one molded end. The opposite end has a metal end double seamed to the flange. The body wall has a shoulder and a 50% reduced thickness wall near the flanged end. The body wall at the flanged end and the flange are the same thickness and the flange is straight and 90 degrees to the body. The can is designed to contain ham.

U.S. Pat. No. 3,507,086 discloses a straight walled, monolayer, extruded, thermoplastic can with a flange formed by blowing into a stationary or moving mold. The flange is the same thickness as the body and is preferred to be at 45 degrees to the body although semicircular or perpendicular flanges are possible. Metal ends are crimped or rolled onto the flanges. The can is designed to contain oil.

U.S. Pat. No. 3,538,595 discloses a straight-walled, monolayer, ethylene copolymer or polypropylene thermoplastic can extruded as a tube, shock cooled, and cut to stress-form a flange. The body and flange are about 1 mm (40 mils) thick and metal ends are crimped to the 2 mm (80 mil) wide outwardly flared flanges. The can is designed to contain oil.

U.S. Pat. No. 4,559,197 discloses a straight-walled, monolayer, biaxially drawn polyethylene terephthalate can which has been annealed. The 90 degree flanges are formed by dies with the can ends heated to a temperature above the glass transition temperature, but below the heat-set temperature. The die can be a metal end for the can which is subsequently double-seamed. The can is designed to contain a processable food or beverage.

U.S. Pat. No. 4,587,075 discloses a straight-walled, monolayer, biaxially drawn polyethylene terephthalate can which has been heat set. The body is heat set at a temperature higher than the use temperature, but less than the glass transition temperature, while being restrained from shrinking. Metal ends can be seamed to the can ends. The can is designed to contain a processable food or beverage.

U.S. Pat. No. 4,667,454 discloses a straight-walled, multilayer polypropylene can injection blow molded or thermoformed with one molded end. The opposite end has a metal end double seamed to a molded flange. The body wall has a ridge near one or both ends and is about 0.79 mm (31 mils) thick with a flange about 0.64 mm (25 mils) thick at 77.5 degrees to the body. The molded (bottom) end of the can is deformable under the different pressures of hot filling and retorting to prevent paneling. The body is heat treated to a temperature higher than the use (sterilization) temperature. The can is designed to contain low-acid foods, such as vegetables that must be retorted.

Japanese publication 57-36611 discloses a method of molding flanges on a straight-walled monolayer polyethylene terephthalate extruded tube, which is then cut into cans, and metal caps are mounted on the ends. The flanges are formed by reheating sections of the extruded and cooled tube above the glass transition temperature and using a vacuum to suck the reheated section into a moving mold to produce a flared (triangular) flange shape. A rectangular shape is also possible. The can is designed to contain various drinks.

U.S. Pat. No. 3,981,663 discloses an apparatus for making high speed corrugated plastic tubing, comprising a pair of complementary upper and lower mold assemblies each comprising an endless chain of articulately interconnected mold blocks and means for guiding the mold blocks along an endless track. The mold blocks define a tubular mold having a corrugated wall. A hot extruded tube of thermoplastic material is expanded into molding engagement with the wall of the mold by means of pressurized air.

U.S. Pat. No. 3,891,773 discloses a method of making corrugated plastic pipe, including continuously extruding a tube of plastic material into a molding zone especially constructed to mold the tube into a series of successive closely spaced body-forming lengths of annularly corrugated pipe. The molded tube is severed to form the pipe into lengths.

SUMMARY OF THE INVENTION

The present invention provides a plastic can body comprising a substantially cylindrical sidewall, wherein said sidewall includes a plurality of circumferential beads extending over at least about 50 percent of the length of the sidewall, said beads having a depth and spacing appropriate to provide resistance to compressive paneling of a metal-lidded can prepared from said can body when subjected to 60 kPa external pressure and to permit compliance of the can body in a longitudinal direction of 0.5% when subject to 0.6–1.8 newtons of longitudinal force per mm of circumference of the can body at room temperature.

The invention further provides a process for making a plastic can with such a sidewall, comprising the steps of:

a. extruding a continuous parison of at least one layer of molten polymer;

b. feeding said continuous parison into a series of continuously moving mold sections having an inside diameter on average about 1 to about 50% greater than the outer diameter of the continuous parison of molten polymer and an interior contour suitable to impart to the can body a plurality of circumferential beads extending over at least about 50 percent of the length of the can body and a radially directed flange at each end of the can body, said sections advancing in the direction and at the approximate speed of the continuous parison of polymer and mating together about said continuous parison to form a series of cavities of the desired shape;

c. applying a pressure outwardly from the interior of said continuous parison while said continuous parison is molten, whereby said continuous parison expands to provide a tube which conforms to the shape of said moving mold sections;

d. cooling the expanded tube to below its solidification temperature;

e. removing said moving mold sections from around the expanded tube; and f. severing the expanded tube transversely to form lengths comprising at least one can body of the desired shape.

In addition, the invention provides a process for applying a metal lid to a plastic can body, comprising the steps of:

a. selecting a plastic can body comprising i. a substantially cylindrical sidewall, wherein said sidewall includes a plurality of circumferential beads extending over at least about 50 percent of the length of the sidewall, said beads having a depth and spacing appropriate to permit compliance of the can body in a longitudinal direction of 0.5% when subject to 0.6–1.8 newtons (0.14–0.41 pounds) of longitudinal force per mm of circumference of the can body at room temperature, and ii. a radially outwardly directed plastic flange at at least one end of the sidewall, said flange flange having a thickness which is about 0.28 to about 0.64 mm (11–25 mils) where it attaches to the sidewall and diminishes to a thickness of about 0.23 to about 0.58 mm (9–23 mils) at its outermost extent, said flange extending outwardly from the outer diameter of the can body for about 2.0 to about 2.5 mm (80–100 mils);

b. selecting a metal lid having a curl extending around the circumference of the lid and a countersunk center, said curl being about 0.20 to about 0.25 mm (8–10 mils) thick, the size of said lid being such that when superimposed on an end of the can sidewall having a flange, the curl extends about 0.75 to about 0.85 mm (30–33 mils) beyond the flange, and said countersunk center having a diameter about 0.025 to about 0.25 mm (1–10 mils) greater than the inside diameter of the can body so as to fit securely therein;

c. placing said metal lid on said flanged end of the can sidewall such that the recessed center fits within the sidewall and the curl extends across the flange;

d. applying pressure to said metal lid, whereby said lid is held against said flange;

e. forming a seam between the curl of the lid and the flange of the can body by i. applying pressure against said curl by a first substantially cylindrical roller which moves progressively around the circumference of the lid, said first roller having a cut-out profile characterized by having a section sloping inwardly from top to bottom toward the axis of the roller at an angle of about 5 to about 25 degrees (especially about 16.6°), the depth of said cutout profile being about 1.3 to about 1.5 mm, (52–59 mils) whereby the curl and flange are folded over each other;

ii. thereafter applying pressure against the folded curl by a second substantially cylindrical roller which moves progressively around the circumference of the lid, said second roller having a cut-out profile characterized by having a section sloping outwardly from top to bottom away from the axis of the roller at an angle of about 3 to about 20 degrees (especially about 7.3°), the depth of said cutout profile being about 0.6 to about 0.9 mm (24–35 mils), whereby said seam is squeezed together and the sidewall is compressed between the end of the curl and the countersunk portion of the lid, thereby forming a seal.

DETAILED DESCRIPTION OF THE INVENTION

Figure 1:
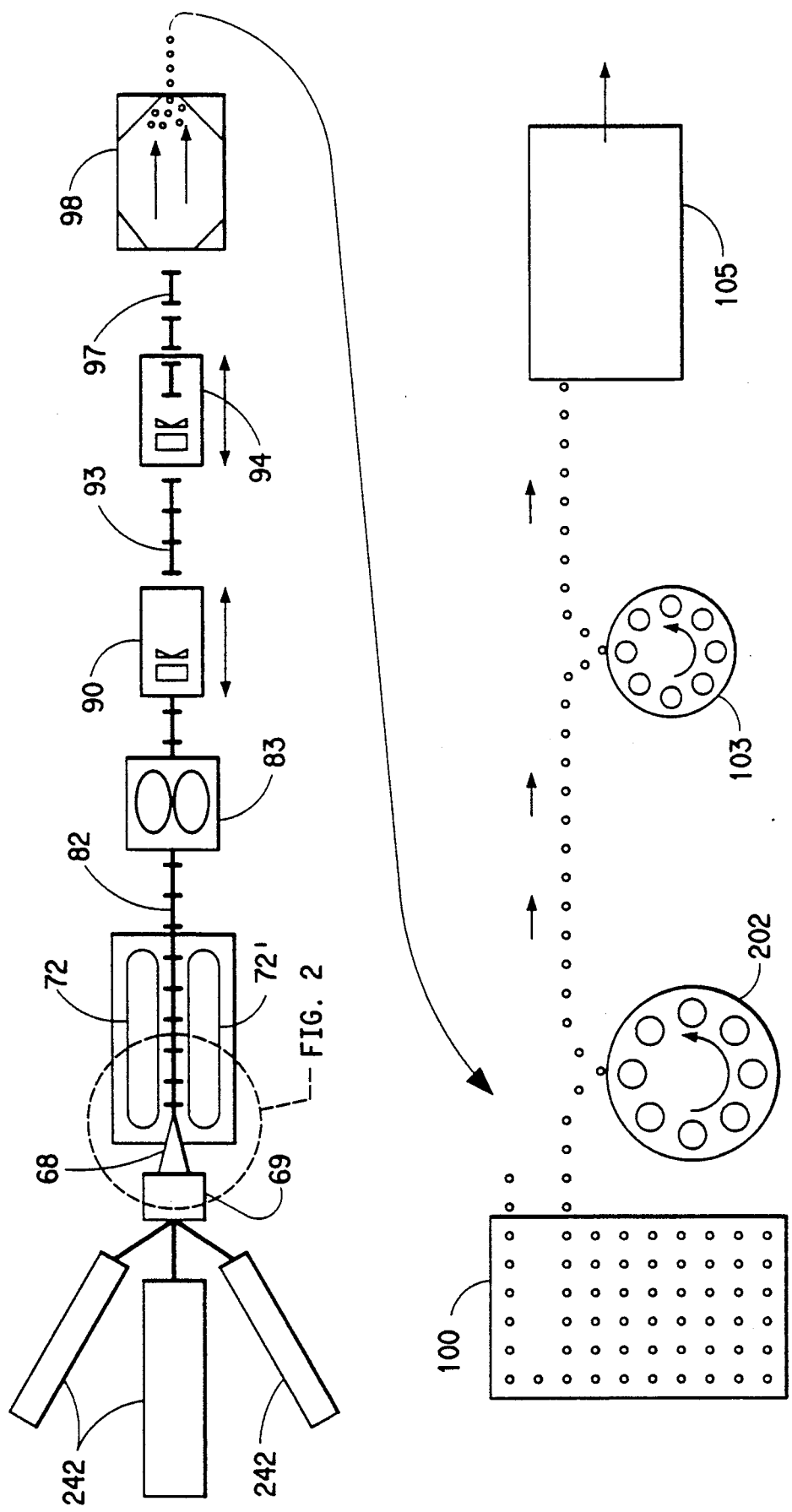
FIG. 1 is a diagrammatic view of a plastic can manufacturing line incorporating the present invention.

The present invention provides a plastic can, a process for preparing the plastic can body, and a process for sealing metal ends to the can body. The can itself, shown in FIG. 5, comprises a plastic can body 20 and (ultimately) two metal ends or caps 22 and 24, one sealed to each end of the body. The can body comprises a substantially cylindrical sidewall 26 which contains a plurality of circumferential grooves or beads 28. The beads provide resistance to inward collapse of the walls, a process known as "panelling." Panelling is of concern when the pressure inside the can is less than the external pressure, and can be a problem when plastic materials are used, particularly at elevated temperatures. The beads should be of sufficient number and of an appropriate geometry to provide resistance to panelling of the final metal-lidded can when it is subjected to 60 kPa external pressure. The beads further provide a measure of compliance along the longitudinal axis 30 of the can body, permitting the height of the can to be compressed slightly to accommodate the forces involved in lidding and sealing the can, discussed in greater detail below. They also permit the can to "grow" axially somewhat in response to internal pressure generated during the canning process. The beads should thus be of sufficient number and suitable geometry to permit compression of the can body in a longitudinal direction of 0.5% when subject to 0.6 to 1.8 newtons of longitudinal force per millimeter of circumference at room temperature. For a typical can having a diameter 32 of about 67 mm (2.6 inches) and a height 34 of about 96 mm (3.8 inches), this corresponds to a compression measured in one instance of 0.52 mm (0.020 inches) under a load of 244 newtons (25 kg or 55 pounds).

Figure 4:
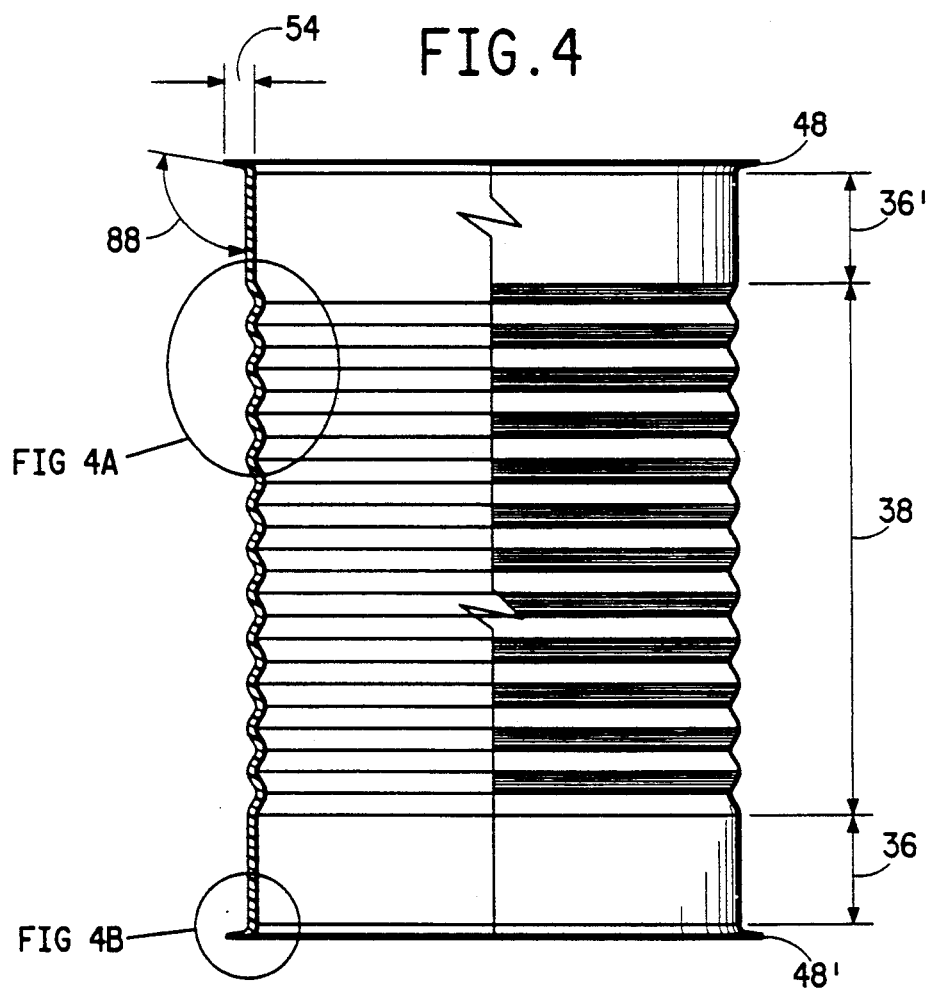
FIGS. 4, 4a and 4b are a partial sectional view of a cut and trimmed can body.
Figure 4A:
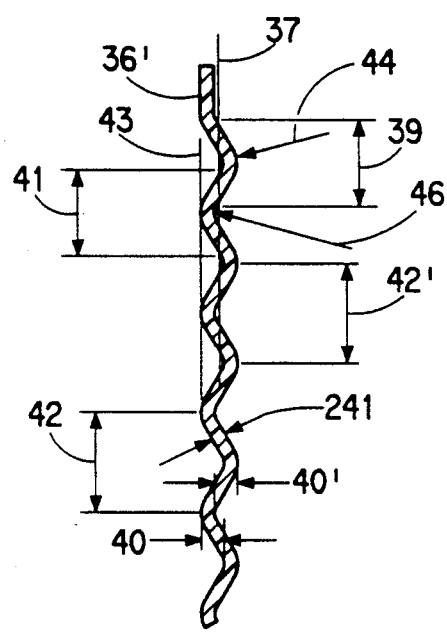

The bead design for the can body will, of course, vary somewhat with the materials of construction, but for the preferred materials, set forth below, the preferred design is illustrated in FIGS. 4 and 4a. A non-beaded portion 36 and 36' at each end of a beaded length 38 extends over at least about 5 percent of the length of the sidewall, and the beads comprise connected, inwardly and outwardly directed, circumferential convolutions or beads that extend substantially continuously over the central 65% to 75% of the sidewall.

FIG. 4a illustrates a preferred bead design and can be used to establish a definition of the beads for comparison with other designs. Line 37 defines an axis through the center of the width of the cross-section of the beaded portion 38 of the body. Segment 39 along line 37 defines an inwardly directed bead and segment 41 defines an outwardly directed bead. The two beads are interconnected and are mirror images of each other. The beaded portion 38 in FIG. 4 thus comprises a plurality of interconnected inwardly and outwardly directed circumferential beads that are mirror images of each other. Line 43 in FIG. 4a is an extension of the outside diameter of the straight portion 36' of the can body. The beads all fall inside line 43, and the outwardly directed beads are tangent to line 43. This geometrical arrangement is useful in order to provide a constant diameter support surface for transporting and handling the cans and for labels that may be attached to the outer diameter of the can body, spanning the beaded portion 38 and extending onto the end portions 36 and 36'. The shape of the beads may be varied from that illustrated while still achieving similar results. For instance, the beads may have a sinusoidal, trangular, regular trapezoidal, rectangular, or other uniform shape which achieves the same radial and axial load characteristics and which preferably provides a uniform support surface.

In a preferred embodiment the beads are about 0.8 to about 2.5 mm (31-100 mils) deep from peak to valley as at 40 and 40' and have a pitch spacing of about 2.5 to about 5.0 mm (100-200 mils) as at 42 and 42'. More preferably they are about 1 mm (40 mils) deep and spaced about 4 mm (157 mils) apart, for a wall thickness 241 of 0.76 mm (30 mils). The pitch to depth ratio is suitably about 3 to 5:1, preferably about 4.25:1. The beads of this preferred structure have an outer radius 44 of about 1.1 mm (43 mils) and an inner radius 46 of about 0.4 mm (16 mils). Bead designs which differ markedly from these parameters are not as satisfactory. Beads with the same spacing but greater depth, e.g. with a pitch to depth ratio of 2.12, provide superior radial strength but excessive axial compression during lidding and excessive growth during retorting, which causes a decrease in radial strength. On the other hand beads with a 13 mm (0.51 inch) separation and 2 mm (79 mil) depth, ratio 6.5, provide axial compression and growth, but poor radial strength.

Figure 4B:
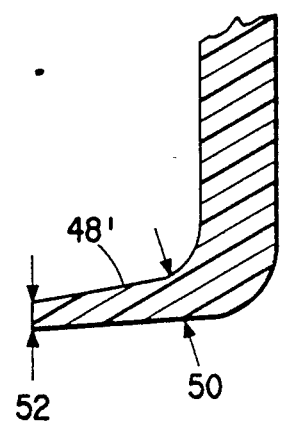

At each end of the can sidewall is a radially outwardly directed flange 48 and 48' used for forming a seal with a metal lid, described below. In FIG. 4b the flange 48' has a thickness 50 of about 0.28 to about 0.64 mm (11-25 mils) where it attaches to the sidewall, which diminishes to about 0.23 to about 0.58 mm (9-23 mils) at its outermost extent at 52. The width of the flange 48 extends outwardly at 54 for about 2.0 to about 2.5 mm (80-100 mils), i.e., far enough to suitably engage the metal lid, as described below.

The can body is preferably made from a plastic composition which exhibits sufficient barrier properties to permit long-term storage of perishable food and sufficient thermal properties to be able to withstand a retort cycle used for processing canned foods. Typically to provide such a combination of properties a multiple layer structure as shown in FIG. 5A is required, including at least one structural polymer layer and at least one barrier polymer layer. In a preferred embodiment there are two structural layers, an outwardly facing layer 56 of filled polypropylene and an inwardly facing layer 58 of unfilled polypropylene. The filler is preferably calcium carbonate (at a 20% level), a rubber-like filler for impact resistance, and about 2% white pigment for coloring. Other conventional fillers and additives may likewise be used, such as nucleants to accelerate crystallization, mica to improve barrier properties, or talc to improve modulus at high temperature. Preferably such additives will reside in the outwardly facing layer in order to avoid possible contamination of foodstuffs contained within the can. The structural layers may also be prepared from other customary structural polymers depending, of course, on the properties desired and the extent to which the can must withstand elevated temperatures during processing. Polymers which may sometimes be suitable include polyolefins such as polybutylene, polypropylene (either homopolymers or copolymers with ethylene), polyesters including for example polyethylene terephthalate, polycarbonate, polyacrylate and its copolymers, or polymers based on vinyl chloride.

The barrier layer 60 is any polymeric material which can provide significant barrier to penetration by such gaseous materials such as carbon dioxide, hydrocarbons, or preferably oxygen. Ordinary structural materials such as polyethylene or polypropylene are poor barriers to oxygen. Certain polyesters and polyamides are better, while ethylene vinyl alcohol copolymers are generally very good. Typical oxygen permeability values for such materials at 20° C. are shown below, in units of $cm^3$-mil/100 $in^2$-day-atm:

| Polymer | permeability. | |
|---|---|---|
| | 20% rel. humid. | 80% r.h. |
| polyethylene | 150 | 240 |
| polypropylene | 130 | 190 |
| polyethylene terephthalate (oriented) | 4.0 | 6.3 |
| nylon | 2.0 | 1.6 |
| EVOH copolymers | 0.005 | 0.35 |

A suitable barrier layer should normally have an oxygen permeability of less than about 10 at 80% relative humidity, preferably less than about 2, more preferably less than about 1, and most preferably less than about 0.5. (To determine the actual rate of oxygen transmission for a particular structure, the thickness of the barrier layer must be taken into consideration.) The barrier layer is preferably a vinyl alcohol polymer, although other materials such as polyvinylidene chloride and its copolymers or certain polyesters could also be suitable for certain applications. The preferred vinyl alcohol polymer is an ethylene vinyl alcohol copolymer, containing about 20 to about 60, and preferably about 25 to about 50 mole percent copolymerized ethylene. A copolymer containing about 30 percent copolymerized ethylene has been found to be particularly effective. The barrier layer 60 is preferably located between the two outer structural layers 56 and 58 described above and preferably comprises a smaller portion of the thickness of the wall structure than do the structural layers. The relative thicknesses of the layers may be varied to accommodate the need at hand, but preferably the barrier layer will be about 0.02 to about 0.05 mm (0.8-2 mils) thick, the outwardly facing structural layer will be about 0.2 to about 0.6 mm (8-24 mils) thick, and the inwardly facing structural layer will be about 0.1 to about 0.3 mm (4-12 mils) thick. The overall can wall thickness 62 will be about 0.3 to about 0.9 mm (13 to 35 mils), preferably about 0.5 to about 0.8 mm (20 to 30 mils).

In addition to the structural and barrier layers, one or more additional layers such as adhesive layers 64 and 66 may be provided. Suitable adhesives will of course depend on the nature of the layers to be adhered; for layers of polypropylene and ethylene vinyl alcohol copolymer, blends of maleic anhydride grafted ethylene propylene copolymer in an ethylene vinyl acetate copolymer matrix is suitable.

Figure 2:
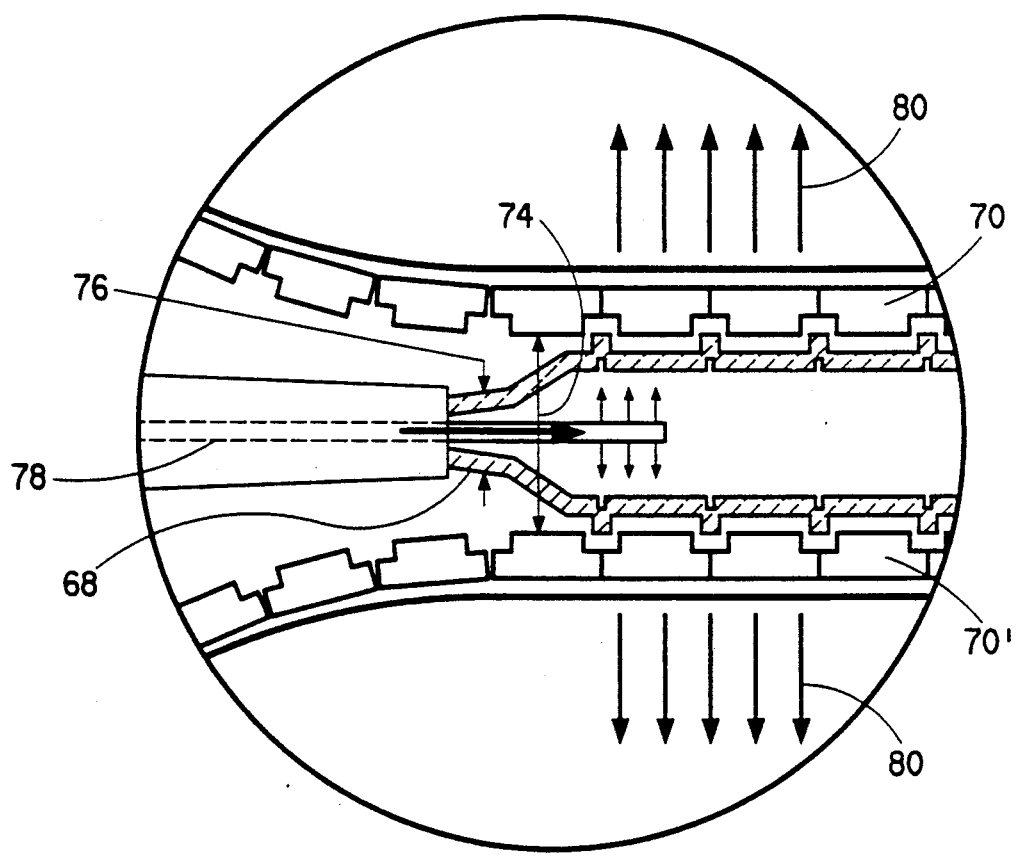
FIG. 2 is a detailed view of an extruded continuous parison entering a moving mold.

The can body is preferably prepared by an extrusion process shown diagrammatically in FIGS. 1 and 2. A tube or continuous parison 68 comprising at least one layer of a molten polymer is extruded from at least one extruder 242. When a multiple layer can body is desired, the continuous parison will be formed by coextrusion of the desired number of layers using a circular die 69 designed for such coextrusion and using techniques known to those skilled in the art. For the polypropylene and ethylene vinyl alcohol copolymer structure described above, an exit temperature from the die of about 250° C. (480° F.) is suitable. The wall thickness of the molten continuous parison should be slightly greater than that of the finished can body, to account for slight expansion of the tube diameter when conformed to a mold, described below. The molten continuous parison 68 is fed between a series of continuously moving mold halves 70, 70', as shown in FIG. 2. The mold sections move forward on a continuous chain or belt system 72, 72' at a speed approximately matching that of the molten continuous parison. A moving mold process is known in the art and has been described, for example in U.S. Pat. No. 3,981,663, the disclosure of which is incorporated herein by reference. The mold sections have an inside diameter 74 on average about 1 to about 50% greater than the outer diameter 76 of the continuous parison of molten polymer and an interior contour suitable to impart to the can body the circumferential beads described above. The size of the mold thus should be sufficiently large that the continuous parison of molten polymer can pass thereinto without interference. After entering the moving mold sections, the continuous parison is caused to expand slightly to conform to the shape of the mold. This expansion is caused by application of a pressure differential, normally by injection of air to the interior of the continuous parison through channel 78 in FIG. 2, and optionally also by applying a vacuum 80 to the mold. Applying a vacuum to the mold is preferred rather than plugging the tube bore with a contacting seal and pressurizing the bore. Use of the vacuum minimizes damage to the thin walled tube and permits higher operating speeds and easier start-up. Normally the extent of radial expansion in the portion of the continuous parison corresponding to the main sidewall of the can (excluding the flange area) is about 15-30%. The polymer is rapidly cooled by cooling the dies in contact with the polymer and by injecting cooling fluid (such as chilled air and water mixed) through channel 78 into the interior of the polymer tube. The more rapidly the polymer is cooled, the faster a given length line can run. The dies are preferably cooled to an initial temperature of about 25° C. (77° F.) by means of exterior cooling fins and an air stream, or by other means as necessary (internally or externally applied cooling water, liquid nitrogen, etc.) so that the expanded tube is cooled to below its solidification temperature before removal from the mold. The resulting molded tube itself (82 in FIG. 1) may be further cooled if desired by application of a stream of air or liquid after exiting the die sections. Removal of the molded tube from the dies can be aided by a belt puller system 83, provided the pulling force exerted is not so extreme as to distort the tube while it is still hot.

Figure 3:
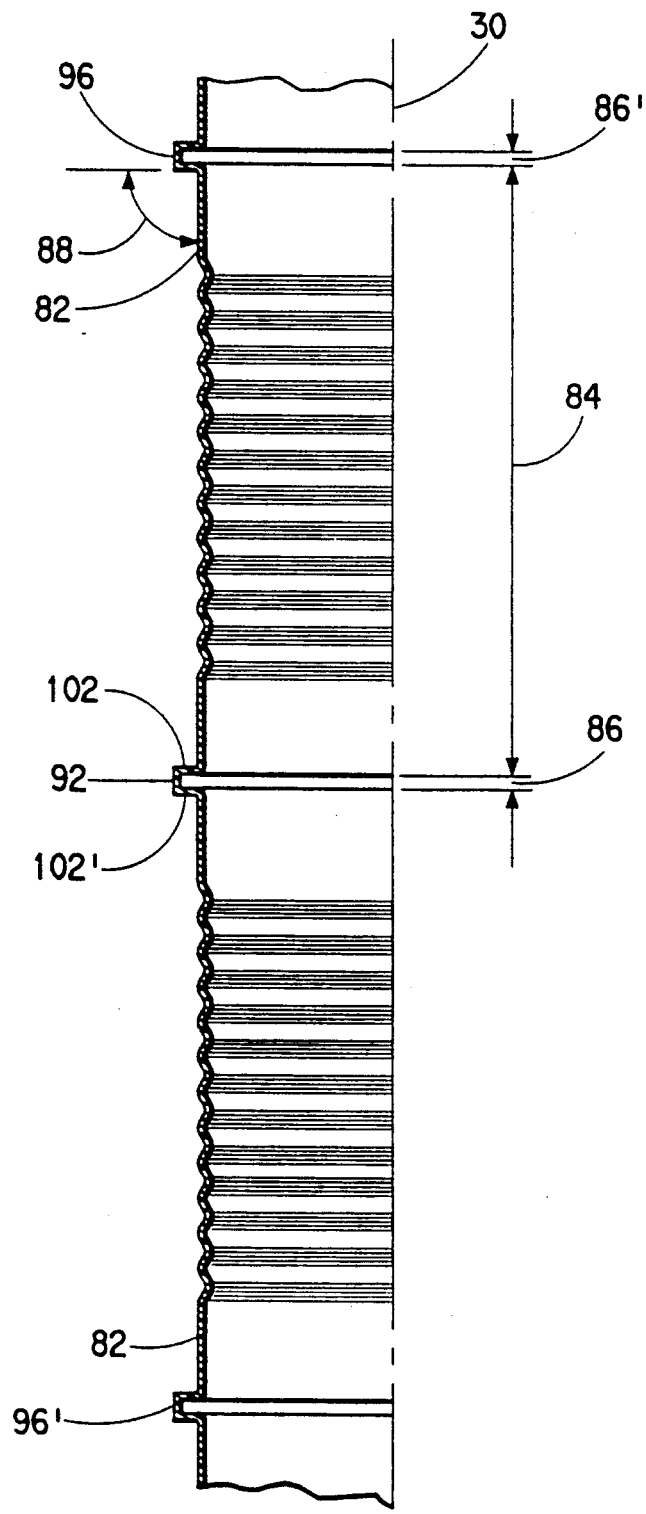
FIG. 3 is a view of molded tube of the present invention before cutting to form can bodies.

The resulting continuous tube 82 will have a structure as shown in FIG. 3. The sections destined to become the can sidewalls are indicated as 84, and the sections destined (after trimming) to become the flanges are designated 86 and 86'. (The molds are preferably designed to provide flanges which are disposed at about 95 degrees away from the can sidewall as at 88, in order to provide for ease of removal from the molds.)

The continuous, expanded tube is next severed transversely by a separator (90 in FIG. 1) to form lengths comprising at least one can body. This is normally accomplished by a rough cut at the location indicated by 92 in FIG. 3. The separator may be stationary and rapidly slice through the tube like a guillotine, or it may periodically move along with the tube during separation. The separator may be mechanical or may involve laser cutting. If a mechanical cutter is used the tube should be maintained to some extent an an elevated temperature in order to obtain high cutting rates. Thus if the rate of severing is greater than 180 cuts per minute, the temperature of the molded tube 82 at the separator 90 should be at least about 65° C. (149° F.). In any event, the tubing continues moving during the separation process and the separator makes a coarse cut perpendicular to the tube axis between the can bodies, normally producing "logs" 93 of molded tubing which may be one or more meters in length and contain many can replicates. In such a case the logs are then fed to a cutter 94 that separates the individual can bodies with a coarse radial transverse cut such as at 92, 96, 96' (FIG. 3). The rough cut can bodies 97 are reoriented to an upright position and are fed to an accumulator 98 and thence to a heat treating oven 100.

When the cans bodies come off the extrusion blow-molding line, they may have internal stresses molded in that are detrimental to the final physical properties of the can. These stresses are evident if the can body is cut along the longitudinal axis 30, in which case the body will often deform and curl inwardly. The heat treatment step is designed to remove these stresses. This is shown in FIG. 1 as being applied to the rough cut can bodies 97, but it may alternatively be applied to the rough cut logs 93. The lengths of can bodies are maintained at a sufficient temperature and a sufficient time to relax these stresses, yet not so severe as to cause the tube to melt or deform. The log lengths 93 or can bodies 97 are held or supported in such a way to minimize any distortion during this treatment; preferably they are held vertically. The actual temperature of the heat treatment will depend on the materials of construction of the cans and the use or processing temperatures which they will subsequently encounter. For cans with polypropylene-based structural layers, the temperature should be at least about 120° C. (250° F.) but less than about 150° C. (300° F.), the softening point. Initial heating at a temperature of about 138° C. (280° F.) for five to fifteen minutes has been found to be satisfactory. For many polymers an additional heat treatment is desirable at a lower temperature which will maximize crystallization of the polymer. For polypropylene this temperature is about 93° C. (200° F.). The polymer should be held at this temperature for perhaps 5-15 minutes to ensure complete crystallization. Alternatively the can bodies can be gradually cooled over a period of about 45 minutes to reach this temperature. Thus a suitable heat treatment cycle can involve subjecting the can bodies to 120°-150° C. (250°-300° F.) for about 10 to about 20 minutes, followed by cooling at 0.4° to 1.0° C. (0.7°-1.8° F.) per minute to a temperature of about 90° to about 100° C. (194°-212° F.), and maintaining that temperature for about 2 to about 20 minutes. Thereafter the can bodies or logs can be rapidly quenched to end the heat treatment cycle. In particular, one suitable heat treating cycle involves heating to 138° C. (280° F.) over a period of five minutes, maintaining that temperature for five minutes, cooling to 114° C. (237° F.) over a period of ten minutes, maintaining that temperature for five minutes, then cooling at a rate of about 0.7° C. (1.3° F.) per minute to 93° C. (200° F.), followed by rapid cooling to 66° C. (150° F.) before removal from the oven.

As a result of this heat treatment, the resistance of the resulting cans to distortion and panelling is dramatically increased. Thus the can can withstand higher negative pressure (about twice the negative pressure) or withstand negative pressure for a longer time (about five times as long) without paneling than can cans which are not heat treated. The heat treatment process is also observed to reduce the oxygen permeability rate of the can bodies by about 50%. The can shrinks by about 0.4% as a result of the heat treating; this change can be compensated for in die design.

After heat treatment the cans are precision trimmed as at 102, 102' in FIG. 3, using a die cutter (202 in FIG. 1) to provide the desired flange dimensions (defined above). The precision trimming may be by mechanical means, or by laser or ultrasonic cutting, etc. The non-beaded bore of the can body is normally supported by a plug which preferably fits snugly inside the body. The fit is preferably the same as the lid that will eventually be seamed to the end of the body so that the flange diameter is precisely cut to a size desired for good seam forming. One suitable trimming means is a 360° "cookie" type cutter having a straight wall inside diameter and a beveled outside diameter. The cutter works against a flat anvil which is split in half to form two "C"s which fit around the can body and support the flange opposite the cutter edge.

The completed can body is supplied with ends, caps, or lids at seaming station 103 in order to form the complete can. Normally, only one lid is applied and the container is palletized at 105 and sent to a food processor for filling and double seaming the second lid. The procedures for applying the first and the second lid are substantially identical except that for the second lid the height of the can may be slightly different, requiring minor equipment height adjustments. In addition, since liquid foodstuffs are normally inserted in the can while hot, e.g. at 75°-85° C. (167°-185° F.), this may affect the stiffness of the can body somewhat. Minor compensatory changes in the processing equipment to accommodate these changes are within the abilities of one skilled in the art.

Figure 5:
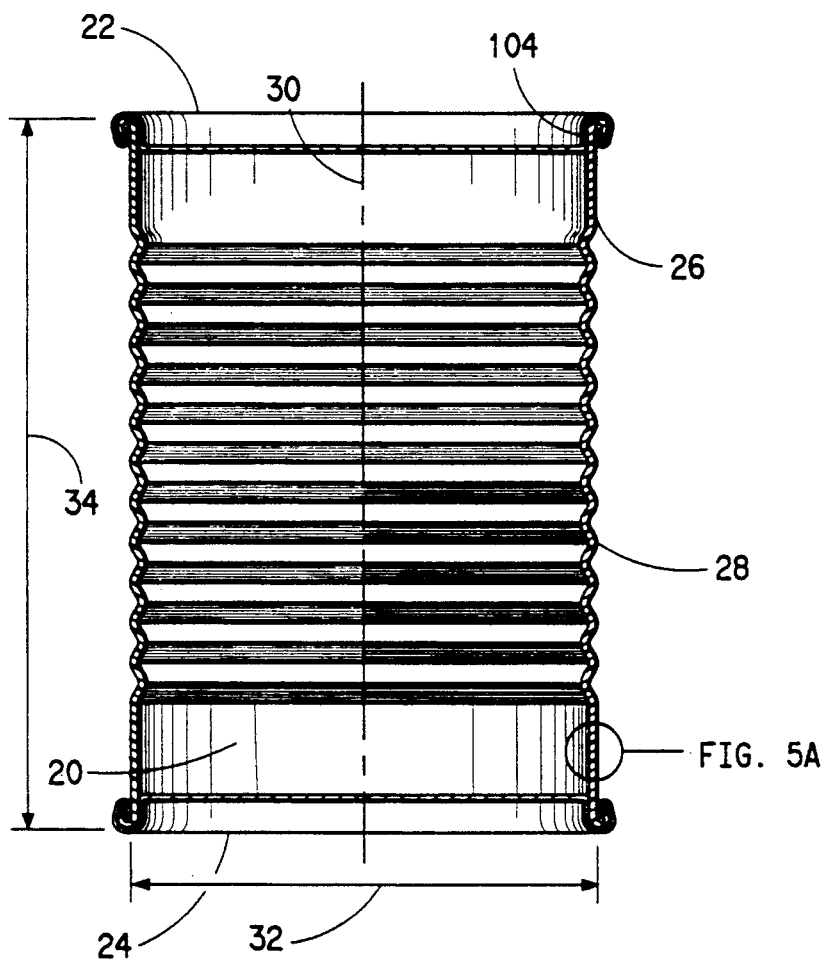
FIG. 5 and 5a are a view of a completed can of the present invention.
Figure 5A:
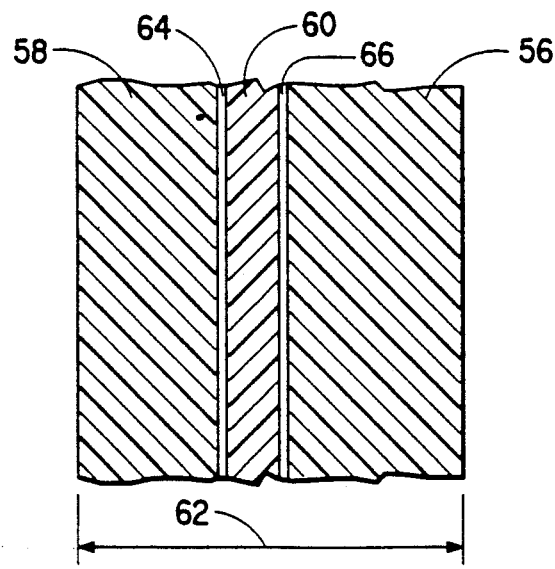
Figure 6:
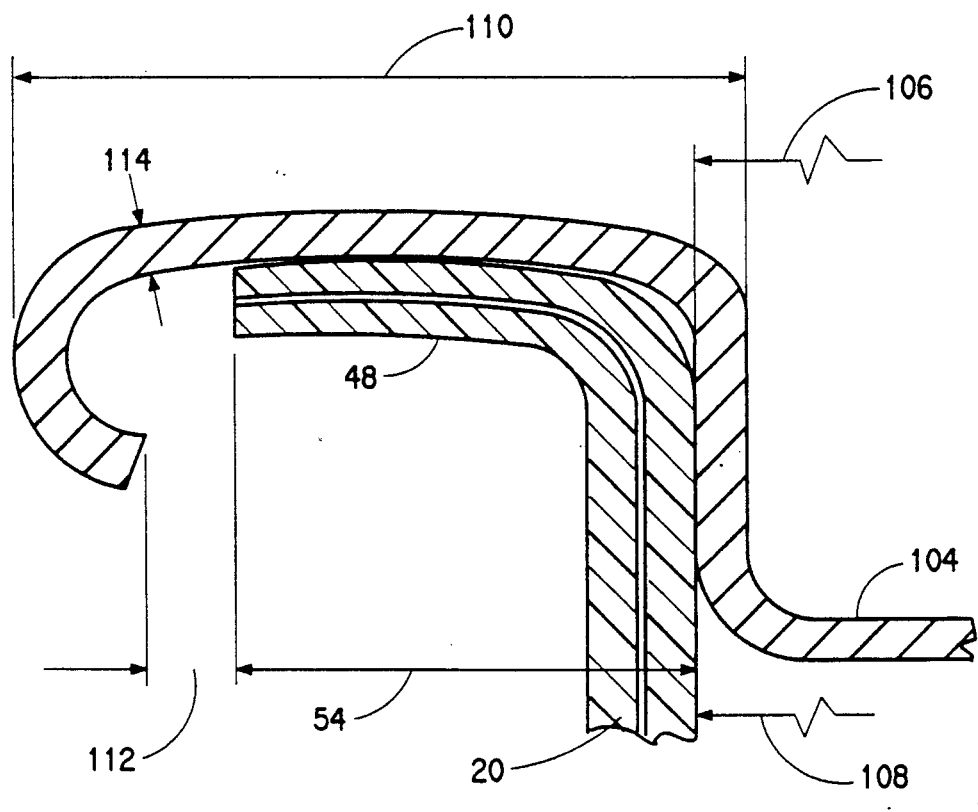
FIG. 6 is a cross-sectional view of a plastic can flange and a metal lid before seaming.

The lids contemplated for the present can are the customary metal can lids with a slightly countersunk center, as known in the art and illustrated at 22 and 24 in FIGS. 5 and 6. The countersunk center 104 will preferably have a diameter 106 about 0.025 to about 0.25 mm (1-10 mils) greater than the inside diameter 108 of the can so as to provide a snug frictional fit therein. The outer rim 110 of the lid, known as the "curl," fits over the flange 48 on the end of the can body 20 and extends outwardly about 0.75 to about 0.85 mm (30-33 mils) beyond the flange as at 112. The thickness 114 of the curl as well as the remainder of the lid is about 0.20 to about 0.25 mm (8-10 mils).

The lid is sealed to the can body in a so-called double seaming process. Force is first applied to the lid to hold it securely in place in the can body. This force is typically sufficient to cause an empty can at room temperature to compress about 0.5% or about 0.52 mm (20 mils) in length; the force for a can of the dimensions and materials described above would be about 244 newtons (25 kg or 55 pounds). For a can filled with hot food contents the required force would be about half that. It is believed to be important that the can exhibit the specified degree of compression as a function of applied force and that the can body be compliant enough to undergo the different deflections in the seamer from the shortest to the tallest can without undue force buildup. It is believed that the beaded plastic can of the present invention is advantageously more compliant and, therefore, more forgiving of length variations common to plastic cans, than is a straight walled plastic can. The benefit of this improved compliance is accentuated at elevated can temperatures when the second lid is being applied. If the force is insufficient, the lid will not seat properly in the can body and a poor seam will result. If the force is excessive, the flange will deform to decrease the curl clearance 112 and a poor seam will result.

Figure 7:
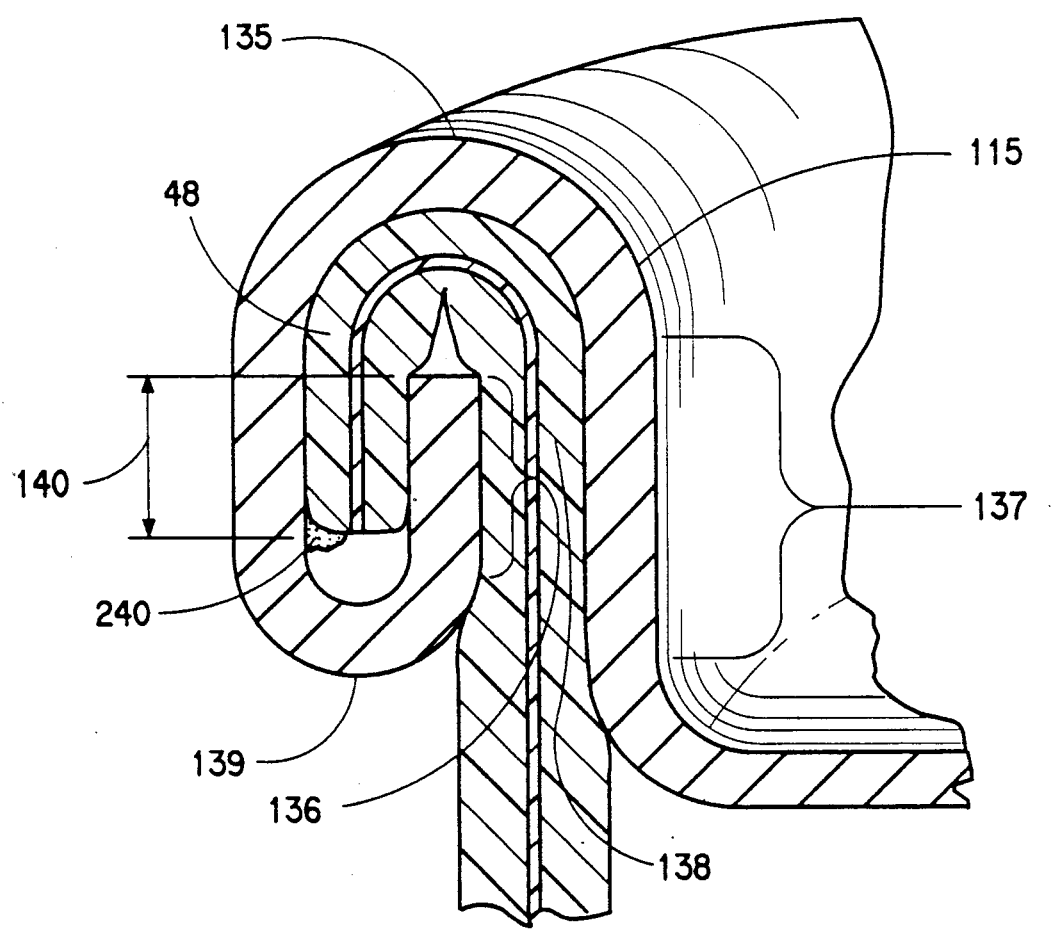
FIG. 7 is a cross sectional view of the seam between the plastic can body and the metal lid after seaming.

Once the lid is securely forced into contact with the can body, the actual sealing is accomplished by forming a seam between the curl of the lid and the flange of the can body. This final seam is shown in FIG. 7. Good sealing depends primarily on controlled compression of the plastic at the seam as the curl 110 and the flange 48 are folded over each other to form the seam structure 115 shown in FIG. 7. A sealing compound may be unnecessary for plastic cans, however, a thin layer of a high solids organic compound, shown as 240 in FIG. 7, may be beneficial. In traditional metal cans it is primarily the sealing compound which is responsible for formation of a hermetic seal. In sealing plastic cans with little or no compound, therefore, proper control of the sealing parameters are much more important. The folded seam is formed on a double seaming machine shown diagrammatically in FIG. 8 (such as an Angelus TM seamer) by applying pressure against the curl, first, by a first substantially cylindrical roller 116 which moves progressively around the circumference of the lid, followed by a second substantially cylindrical roller 118.

Figure 8:
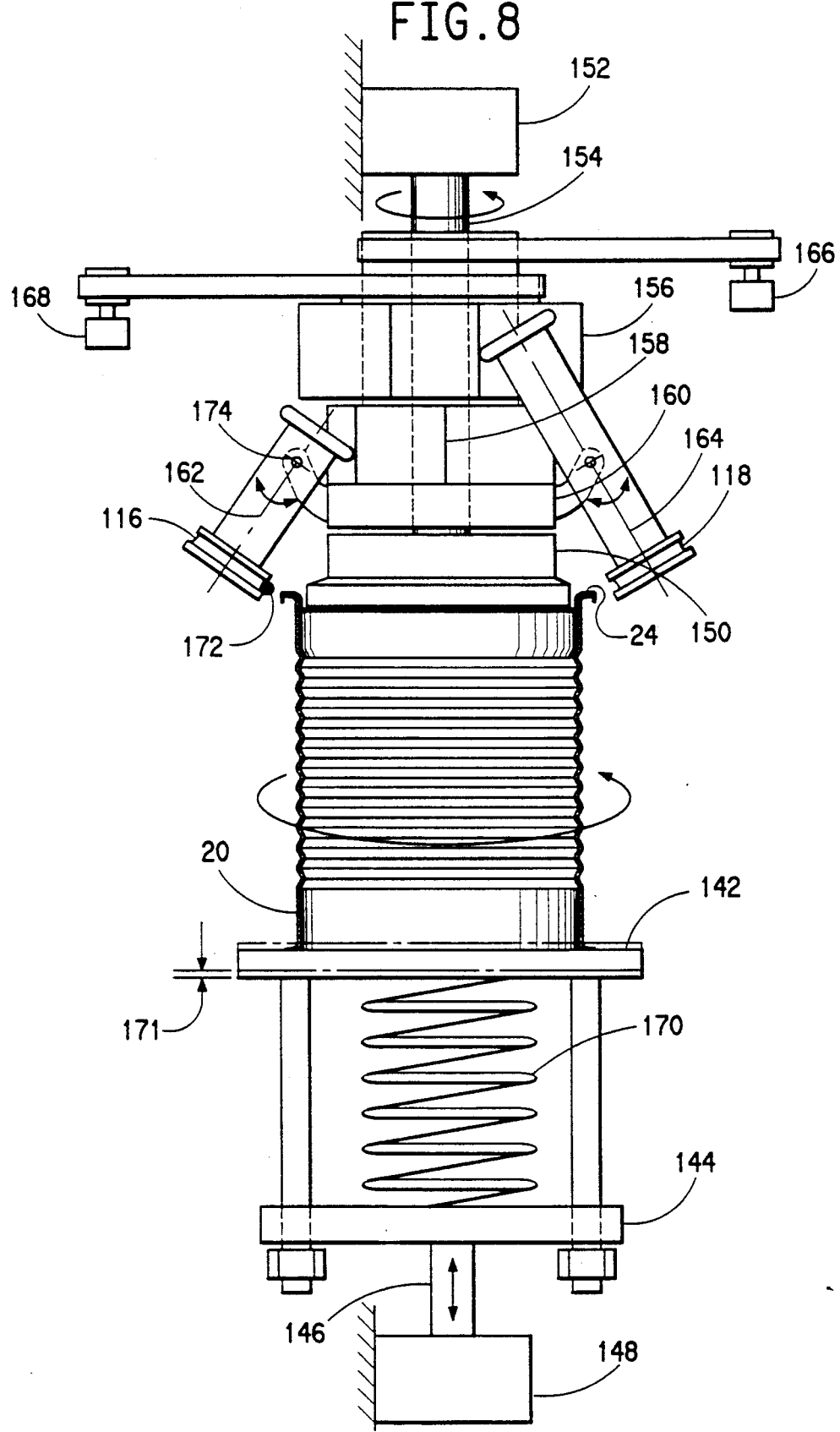
FIG. 8 is a diagrammatic side view of a device for forming the plastic can/metal-lid seam.

FIG. 8 shows a conceptual arrangement that is useful in providing the seam of the invention. It consists of a baseplate 142 that is spring biased away from a support plate 144 which in turn is freely rotatable about shaft 146 that in turn is axially displaceable by cam means 148. The can body 20 with a first lid in position ready for seaming is placed on the baseplate and raised by means 148 to a position that brings the lid in contact with chuck 150. Chuck 150 is rotatably driven by means 152 via shaft 154 that passes through rotatable cams 156 and 158. The baseplate 142 may also be driven. Fixed plate 160 pivotably supports first and second forming rolls 116 and 118. Roll 116 is free to rotate about axis 162 and roll 118 is free to rotate about axis 164. Means 166 rotates cam 158 which results in roll 116 pivoting towards chuck 150. Means 168 rotates cam 156 that results in roll 118 pivoting towards chuck 150. Spring 170 is preloaded to force baseplate 142 away from support 144 with a predetermined load. Raising means 148 is adjusted to place the top of the baseplate a predetermined distance from the bottom of chuck 150. This is referred to as the "pin height" and is usually set to produce about 0.56 mm (22 mils) of deflection of spring 170 (shown as 171) when a solid mass representing the assembled can and lid is present between the chuck and baseplate. For a can of a typical size (number 211), a pin height of about 97.4 mm (3.834 inches) is suitable. When setting the final pivotable position of the rollers 116 and 118, a wire gage such as 172 is placed between the roll profile and the chuck periphery (can and lid removed) when the full cam travel has pivoted the roll toward the chuck. Adjustment means, such as at pivot 174, can provide this adjustment.

In operation of the seamer, the chuck 150 is rotated by means 152; and baseplate 142 with can body 20 and lid 24 is raised by means 148 to clamp the can and lid between the baseplate and chuck. Spring 170 influences the clamping load. The can, lid, and baseplate are thereafter rotated at the speed of the driven chuck. At this point, cam rotating means 166 rotates cam 158 which causes roller 116 to pivot toward chuck 150. When the roller contacts the rotating lid 24 it begins to rotate, and as it pivots further toward the chuck, the lid is progressively deformed by the roller profile. After several rotations of the lid, cam rotating means 166 rotates cam 158 further which causes roller 116 to pivot back to its original position away from chuck 150. At this time cam rotating means 168 rotates cam 156 causing second roller 118 to pivot toward chuck 150. In a manner similar to that described for roller 116, roller 118 deforms the lid further and after several revolutions of the lid the roller is withdrawn to its original position. The baseplate 142 is retracted and the seamed can is removed and inverted for further processing.

Figure 9:
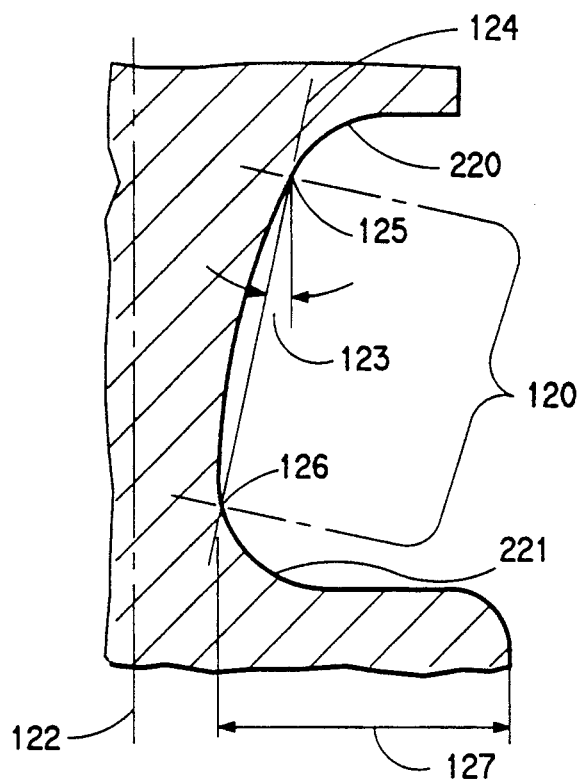
FIG. 9 shows a seam-forming roll profile.
Figure 11:
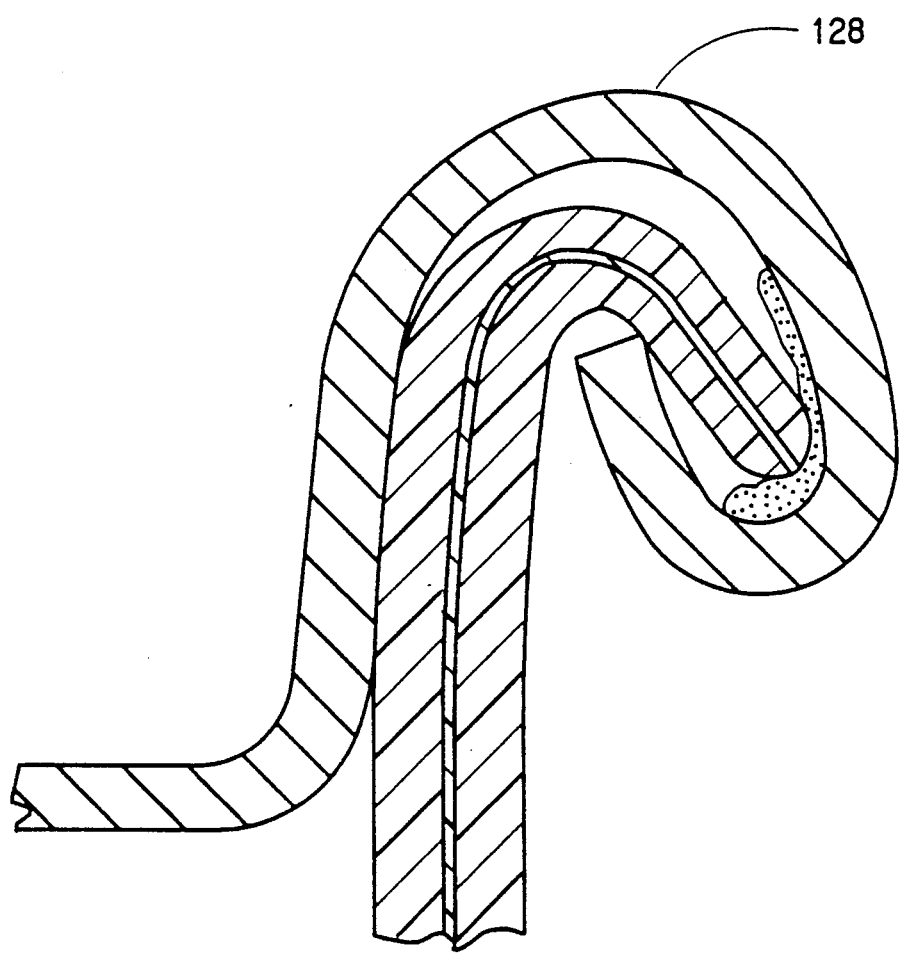
FIG. 11 is a section of a seam after the first seaming roll operation.

A suitable first roller is an Angelus TM forming roller R27. This roller has a profile illustrated in FIG. 9 and is adjusted to a wire gage of 2.03 mm (80 mils) for a can 102 mm tall and 68 mm lid diameter (the "211" can). It is characterized by having a section 120 sloping inwardly from top to bottom toward the axis 122 of the roller at an angle 123 defined by line 124 drawn between curved surface tangent points 125 and 126. Tangent points 125 and 126 are defined as the tangential intersections of the relatively straight (long radius of curvature) section 120 with more highly curved (shorter radius of curvature) sections 220 and 221. The angle 123 is about 5 to about 25 degrees, especially about 15 to about 20 degrees, and most especially about 16.6 degrees. The depth 127 of said cutout profile is about 1.3 to about 1.5 mm (51–59 mils). This first roller folds the curl and the flange over each other as shown in FIG. 11. An approximately uniform radius 128 is imparted from the top of the seam to the bottom of the cover hook.

Figure 10:
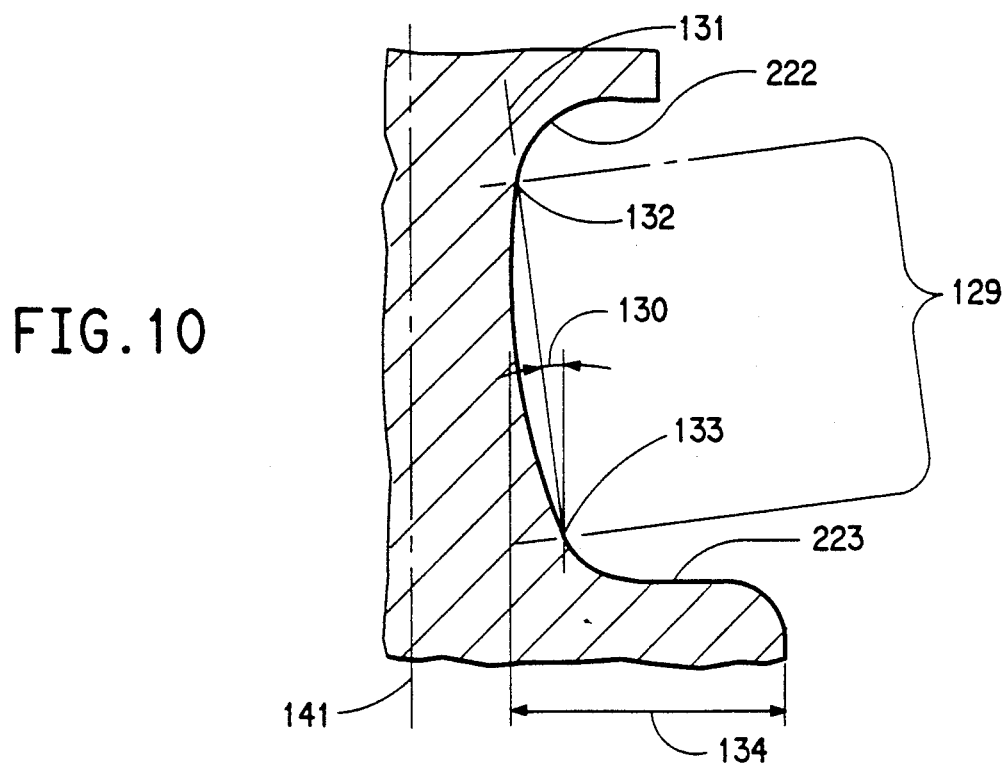
FIG. 10 shows a second seam-forming roll profile.

A suitable second roller 118 is an Angelus TM forming roller S105. This roller has a profile illustrated in FIG. 10 and is adjusted to a wire gage of 1.35 mm (53 mils) for a can 102 mm tall and 68 mm lid diameter (211 can). It is characterized by having a section 129 sloping outwardly from top to bottom away from the axis 141 of the roller at an angle 130 defined by line 131 drawn between curved surface tangent points 132 and 133. Tangent points 132 and 133 are defined as the tangential intersections of the relatively straight (long radius of curvature) section 129 with more highly curved (shorter radius of curvature) sections 222 and 223. The angle 123 is about 3 to about 20 degrees, especially about 5 to about 10 degrees, and most especially about 7.3 degrees. The depth 134 of this profile is about 0.6 to about 0.9 mm (24–35 mils). Notice that, as a result of treatment with the second roller, in FIG. 7 the upper and lower radiuses 135 and 139, respectively, of the seam remain uniform and the cover hook at 136 and the counter sink at 137 are nearly parallel and compress the sidewall of the can body at 138. It is believed that this compression forms the effective seal. For particularly good seams in the preferred cans of the present invention, the plastic sidewall is compressed about 20 to about 30% in thickness and the seam overlap 140 is greater than about 1.0 mm (39 mils).

After the can is made, filled, and sealed according to the above process, the can is ready for use which, in the most severe case, includes high temperature retorting. This is necessary, for example, when it is desired to sterilize the food contents of the can. Retorting of contents of metal cans is a well-known process, yet for a plastic can certain variables must be controlled in order to produce a hermetically sealed, filled can without lid separation, leakage, or panelling during and after the retort process.

In brief, successful retorting of filled cans of the present invention requires heating the plastic can to a temperature and for a time suitable to sterilize the contents of the can. The temperature and pressure of the process must be controlled so that external pressure is maintained at a value sufficiently close to the internal pressure of the can that the can neither ruptures due to separation of the metal lid from the can body nor distorts or collapses due to paneling of the plastic sidewall while the temperature of said sidewall is above its deformation temperature. Thus the pressure differential between the inside and outside of the can should be minimized during the retort cycle. The internal pressure, of course, is generated from the volatile component (normally water) of the contents of the sealed can.

It has been found that successful retorting can be achieved when the maximum temperature of the contents of the can is about 110°-130° C., (230°-266° F.) the maximum excess of the pressure within the can over the externally applied pressure is about 70 kPa (10.2 psi) and the maximum deficit of the pressure within the can under the externally applied pressure is about 30 kPa (4.3 psi). Preferably the contents of the can are heated to about 115° to about 125° C. (239°-257° F.) and the external pressure is maintained such that the pressure within the can is greater than the externally applied pressure by an amount less than about 45 kPa 6.5 psi). These pressure parameters are maintained until the temperature of the sidewall has cooled to less than about 77° C. (170° F.) (for the preferred can structure and composition).

In particular, one particularly preferred set of conditions for retorting in a hydrostatic cooker is set forth. The can is filled with water or a substantially liquid water-containing material which is at a temperature of about 70°-80° C. (about 77° C. or 170° F.). The liquid is filled to within about 9 mm (0.35 inch) of the top of the (half-lidded) can body, and the standard metal top is sealed thereto as described above, before the contents have time to cool appreciably. The contents of the sealed can at this point have a headspace of about 4 mm (0.16 inch) and are under a slight positive pressure (about 7 to about 20 kPa or 1-3 psi) due to the compression caused by the countersink of the lid. Thereafter the filled, sealed can is subjected to an external temperature and changing differential pressure (delta P) of 84°-88° C. (187° F.) and +34 to −21 kPa (+5 to −3 psi) delta P, respectively for 15 to 20 minutes, thereafter at 118°-124° C. (250° F.) and +7 to +41 kPa (+1 to +6 psi) delta P for at least an additional 50-70 minutes, thereafter at 98°-102° C. (213° F.) and −7 to 48 kPa (−1 to +7 psi) delta P for an additional 15 to 20 minutes, and finally at 30°-35° C. (87° F.) and 0 to −28 kPa (0 to −4 psi) delta P for 20-30 minutes before the cans are subjected to normal atmospheric conditions. These processing conditions can be supplied by a conventional retort apparatus using a typical hydrostatic process, which is well known to those skilled in the art. In this type of device the retort pressure in the sterilizing chamber is a function of the height of water columns sealing the chamber that remain fixed during operation. The cans are heated by saturated steam in the sterilization chamber. The differential can pressure is then a function of the temperatures within the can and the axial deformation of the can sidewalls. Such a retort system is described in "A Complete Complete Course in Canning" published by The Canning Trade, Inc., which is incorporated herein by reference. The temperature and pressure reported for the above conditions are suitable to accommodate the expansion and vaporization of the contents, the thermal expansion and axial deformation of the plastic can, and upon cooling, the subsequent condensation of the contents and thermal contraction and axial deformation of the plastic can. Under these conditions it has been found that the internal pressure remains less than about 70 kPa (10 psi) above the surroundings, thus preventing lid separation, and during cool-down the internal pressure is no more than about 30 kPa (4.4 psi) below the pressure of the surroundings, thus preventing collapse or panelling of the can walls.

We claim:

1. A plastic can body comprising a substantially cylindrical sidewall, wherein said sidewall includes a plurality of circumferential beads extending over at least about 50 percent of the length of the sidewall, said beads having a depth and spacing appropriate to provide resistance to compressive paneling of a metal-lidded can prepared from said can body when subjected to 60 kPa external pressure and to permit compliance of the can body in a longitudinal direction of 0.5% when subject to 0.6-1.8 newtons of longitudinal force per mm of circumference of the can body at room temperature.

2. The plastic can body of claim 1 wherein a non-beaded portion at each end of the beaded length, extends over at least about 5 percent of the length of the sidewall.

3. The plastic can body of claim 2 wherein said circumferential beads extend substantially continuously over the central 65% to 75% of the sidewall.

4. The plastic can body of claim 3 wherein the beads are about 0.8 to about 2.5 mm deep and spaced about 2.5 to about 5.0 mm apart.

5. The plastic can body of claim 4 further comprising a radially outwardly directed flange at each end of the sidewall.

6. The plastic can body of claim 5 wherein the flange has a thickness which is about 0.28 to about 0.64 mm where it attaches to the sidewall and diminishes to a thickness of about 0.23 to about 0.58 mm at its outermost extent.

7. The plastic can body of claim 5 wherein the sidewall comprises at least one layer of structural polymer and at least one layer of a barrier polymer.

8. The plastic can body of claim 7 comprising at least three layers, the inwardly facing layer being a structural layer comprising unfilled polypropylene, the outwardly facing layer being a structural layer comprising filled polypropylene, and a central layer being a barrier layer comprising a vinyl alcohol polymer.

9. The plastic can body of claim 8 wherein the inwardly facing structural layer is about 0.1 to about 0.3 mm thick, the outwardly facing structural layer is about 0.2 to about 0.6 mm thick, and the central barrier layer is about 0.02 to about 0.05 mm thick, the total thickness of said can body being about 0.5 to about 0.9 mm.

10. The plastic can body of claim 9 further comprising at least one interior adhesive layer.

11. A process for preparing a plastic can body, comprising the steps of:
   a. extruding a continuous parison of at least one layer of molten polymer;
   b. feeding said continuous parison into a series of continuously moving mold sections having an inside diameter on average about 1 to about 50% greater than the outer diameter of the continuous parison of molten polymer and an interior contour suitable to impart to the can body a plurality of circumferential beads extending over at least about 50 percent of the length of the can body, a non-beaded portion extending over at least about 5% of the length of the can body, and a radially outwardly directed flange at each end of the can body defining the end of the non-beaded portion, said sections advancing in the direction and at the approximate speed of the continuous parison of polymer and mating together about said continuous parison to form a series of cavities of the desired shape;

c. applying a pressure differential outwardly from the interior of said continuous parison while said continuous parison is molten, whereby said continuous parison expands to provide a tube which conforms to the shape of said moving mold sections;

d. cooling the inside and outside of the expanded tube to bring the polymer to below its solidification temperature;

e. removing said moving mold sections from around the expanded tube; and f. severing the expanded tube transversely at an end of a non-beaded portion to form lengths comprising at least one can body of the desired shape.

12. The process of claim 11 wherein the inside diameter of the moving mold is on average about 20 to about 30% greater than the outer diameter of the continuous parison of molten polymer.

13. The process of claim 11 further comprising the step of:

g. heating the lengths for a time and at a temperature sufficiently high to relax residual stresses in said lengths, yet at a temperature below the melting point of the lengths, said lengths being held in such a way as to minimize geometrical distortion.

14. The process of claim 13 wherein at least one layer of the tube is a crystallizable polymer and the heating is for a time and at a temperature sufficiently high to enhance the crystallization rate of such polymer.

15. The process of claim 13 wherein the lengths are maintained in a vertical position during said heating step (g).

16. The process of claim 13 further comprising the steps of:

h. cooling said can bodies after the heating step; and i. precisely trimming said lengths at a radially directed flange to form can bodies of the desired size.

17. The process of claim 16 wherein internal diametral support is provided to the non-beaded portion of the can body during trimming step (i).

18. The process of claim 11 wherein the mold provides to the plastic can body a non-beaded portion at each end of the beaded length extending, in combination, over about 25 to about 35 percent of the length of the sidewall, wherein the beads in the central beaded portion are about 0.8 to about 2.5 mm deep and spaced about 2.5 to about 5.0 mm apart.

19. The process of claim 11 wherein the plastic can body comprises at least three layers, the inwardly facing layer being a structural layer about 0.1 to about 0.3 mm thick, comprising unfilled polypropylene, the outwardly facing layer being a structural layer about 0.2 to about 0.6 mm thick, comprising filled polypropylene, and a central layer about 0.02 to about 0.05 mm thick, being a barrier layer comprising a vinyl alcohol polymer, the total thickness of said can body being about 0.5 to about 0.9 mm.

20. The process of claim 19 wherein the can bodies are subjected in step (g) to a temperature of about 120° to about 150° C. for about 10 to about 20 minutes, followed by cooling at a rate of about 0.4° to about 1.0° C. per minute to a temperature of about 90° to about 100° C., and maintaining said temperature for about 2 to about 20 minutes.

21. A can body prepared by the process of claim 20.

22. A can, comprising:

a. a plastic can body as described in claim 1; and b. a metal lid affixed to at least one end of said plastic can body, said lid being sealed to said plastic can body with a circumferential seam.

23. The can of claim 22 wherein a metal lid is affixed to each end of said plastic can body.

24. A process for applying a metal lid to a plastic can body, comprising the steps of:

a. selecting a plastic can body comprising i. a substantially cylindrical sidewall, wherein said sidewall includes a plurality of circumferential beads extending over at least about 50 percent of the length of the sidewall, said beads having a depth and spacing appropriate to permit compliance of the can body in a longitudinal direction of 0.5% when subject to 0.6-1.8 newtons of longitudinal force per mm of circumference of the can body at room temperature, and ii. a radially outwardly directed plastic flange at at least one end of the sidewall, said flange flange having a thickness which is about 0.28 to about 0.64 mm where it attaches to the sidewall and diminishes to a thickness of about 0.23 to about 0.58 mm at its outermost extent, said flange extending outwardly from the outer diameter of the can body for about 2.0 to about 2.5 mm;

b. selecting a metal lid having a curl extending around the circumference of the lid and a countersunk center, said curl being about 0.20 to about 0.25 mm thick, the size of said lid being such that when superimposed on an end of the can sidewall having a flange, the curl extends about 0.75 to about 0.85 mm beyond the flange, and said countersunk center having a diameter about 0.025 to about 0.25 mm greater than the inside diameter of the can body so as to fit securely therein;

c. placing said metal lid on said flanged end of the can sidewall such that the recessed center fits within the sidewall and the curl extends across the flange;

d. applying pressure to said metal lid, whereby said lid is held against said flange;

e. forming a seam between the curl of the lid and the flange of the can body by i. applying pressure against said curl by a first substantially cylindrical roller which moves progressively around the circumference of the lid, said first roller having a cut-out profile characterized by having a section sloping inwardly from top to bottom toward the axis of the roller at an angle of about 5 to about 25 degrees, the depth of said cutout profile being about 1.3 to about 1.5 mm, whereby the curl and flange are folded over each other;

ii. thereafter applying pressure against the folded curl by a second substantially cylindrical roller which moves progressively around the circumference of the lid, said second roller having a cut-out profile characterized by having a section sloping outwardly from top to bottom away from the axis of the roller at an angle of about 3 to about 20 degrees, the depth of said cutout profile being about 0.6 to about 0.9 mm, whereby said curl and flange are further folded over each other and said seam is squeezed together and the sidewall is compressed between the end of the curl and the countersunk portion of the lid, thereby forming a seal.

25. The process of claim 24 wherein a lid is applied to each end of said can body.

26. A can, lidded at one end by the process of claim 24.

27. A fully lidded can prepared by the process of claim 25.

28. A process for preparing a plastic can with at least one metal lid, comprising the steps of:

a. extruding a continuous parison of at least one layer of molten polymer;

b. feeding said continuous parison into a series of continuously moving mold sections having an inside diameter on average about 1 to about 50% greater than the outer diameter of the continuous parison of molten polymer and an interior contour suitable to impart to the can body a plurality of circumferential beads extending over at least about 50 percent of the length of the can body and a radially directed flange at each end of the can body, said sections advancing in the direction and at the approximate speed of the continuous parison of polymer and mating together about said continuous parison to form a series of cavities of the desired shape;

c. applying a differential pressure from the interior to the exterior of said continuous parison while said continuous parison is molten, whereby said continuous parison expands to provide a tube which conforms to the shape of said moving mold sections;

d. cooling the expanded tube to below its solidification temperature;

e. removing said moving mold sections from around the expanded tube; and f. severing the expanded tube transversely to form lengths comprising at least one can body of the desired shape;

g. precisely trimming said lengths to form can bodies of the desired size having a radially extending flange at each end thereof having a thickness which is about 0.28 to about 0.64 mm where it attaches to the sidewall and diminishes to a thickness of about 0.23 to about 0.58 mm at its outermost extent, said flange extending outwardly from the outer diameter of the can body for about 2.0 to about 2.5 mm;

h. selecting a metal lid having a curl extending around the circumference of the lid and a countersunk center, said curl being about 0.20 to about 0.25 mm thick, the size of said lid being such that when superimposed on an end of the can sidewall having a flange, the curl extends about 0.75 to about 0.85 mm beyond the flange, and said countersunk center having a diameter about 0.025 to about 0.25 mm greater than the inside diameter of the can body so as to fit securely therein;

i. placing said metal lid on said flanged end of the can sidewall such that the recessed center fits within the sidewall and the curl extends across the flange;

j. applying pressure to said metal lid, whereby said lid is held against said flange;

k. forming a seam between the curl of the lid and the flange of the can body by i. applying pressure against said curl by a first substantially cylindrical roller which moves progressively around the circumference of the lid, said first roller having a cut-out profile characterized by having a section sloping inwardly from top to bottom toward the axis of the roller at an angle of about 5 to about 25 degrees, the depth of said cutout profile being about 1.3 to about 1.5 mm, whereby the curl and flange are folded over each other;

ii. thereafter applying pressure against the folded curl by a second substantially cylindrical roller which moves progressively around the circumference of the lid, said second roller having a cut-out profile characterized by having a section sloping outwardly from top to bottom away from the axis of the roller at an angle of about 3 to about 20 degrees, the depth of said cutout profile being about 0.6 to about 0.9 mm, whereby said seam is squeezed together and the sidewall is compressed between the end of the curl and the countersunk portion of the lid, thereby forming a seal.

29. The process of claim 28 wherein the plastic can body comprises at least three layers, the inwardly facing layer being a structural layer about 0.1 to about 0.3 mm thick, comprising unfilled polypropylene, the outwardly facing layer being a structural layer about 0.2 to about 0.6 mm thick, comprising filled polypropylene, and a central layer about 0.02 to about 0.05 mm thick, being a barrier layer comprising a vinyl alcohol polymer, the total thickness of said can body being about 0.5 to about 0.9 mm.

30. The process of claim 28 wherein a foodstuff is inserted into the can before the final lid is applied.

* * * * *